June 16, 1936.  W. E. LINDSAY  2,044,391
SYSTEM OF COMMUNICATION
Filed March 14, 1934
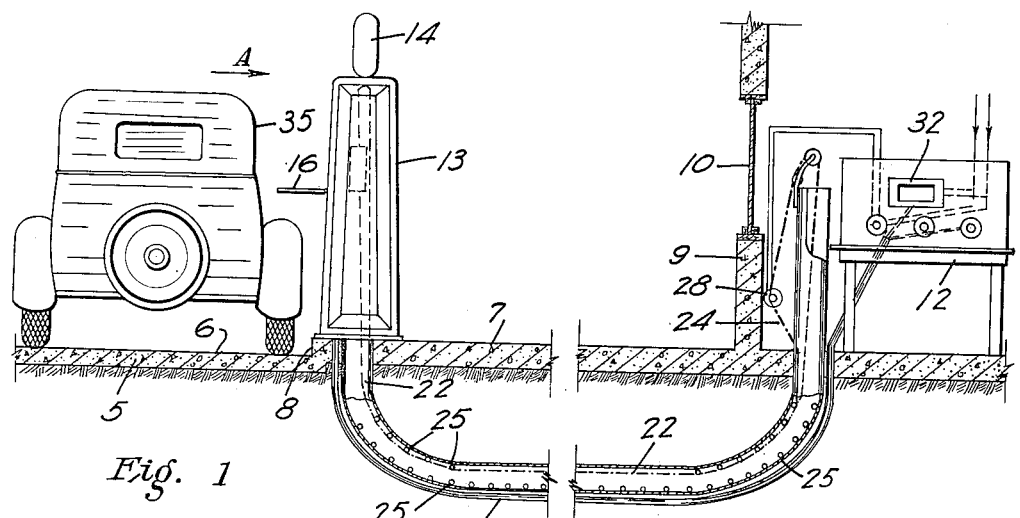
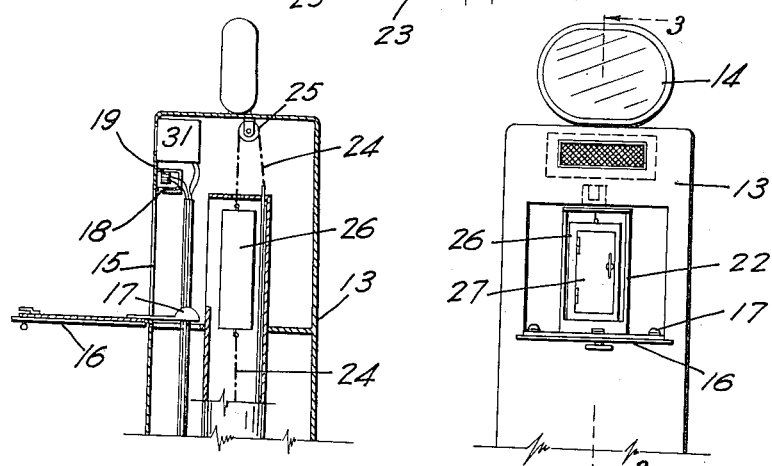
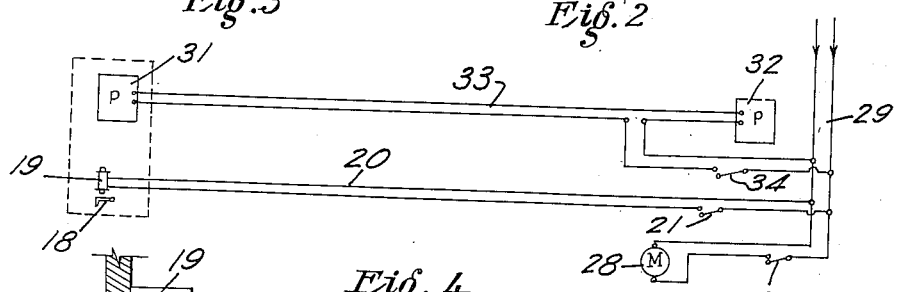
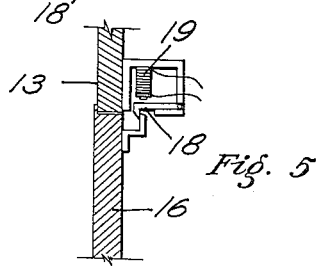
INVENTOR.
Walter E. Lindsay
BY
ATTORNEY.

Patented June 16, 1936

2,044,391

UNITED STATES PATENT OFFICE 2,044,391

SYSTEM OF COMMUNICATION

Walter E. Lindsay, Denver, Colo.

Application March 14, 1934, Serial No. 715,572

5 Claims. (Cl. 186—1)

This invention relates to a system of communication between distant points, at the inside and outside of a business establishment, such as a bank or store.

In the congested business districts of larger towns and cities, the problem of finding parking space for automobiles in convenient vicinity of business houses is a serious handicap to the speedy and satisfactory transaction of business between such establishments and their customers. In most cities, police regulations provide for open spaces opposite the entrances to the buildings, into which motor vehicles may be driven to discharge their passengers. However, the vehicles may occupy such spaces only temporarily, and under no circumstances can the spaces be used for parking purposes even for a comparatively short period of time. In many instances the transaction of business requires but a few moments, notwithstanding which the customer is often compelled to walk a considerable distance from a place at which an automobile may be parked, to the establishment where his business is to be transacted, causing loss of time and other inconveniences.

As an example, a customer of a bank, desiring to make a deposit or to cash a check, must, under present conditions, frequently spend a considerable amount of time on a transaction of business which in itself would take but a few moments, and the same conditions prevail in stores where purchases are to be made without requiring inspection, or for the interchange of merchandise, or for the return of goods or merchandise left for repair, alteration, or credit, etc.

It is the principal object of the present invention to eliminate the difficulties above recited by the provision of a simple system of devices by which a customer may transact business with an attendant in a place of business from a point outside the same, without the necessity of entering the building, and, in most instances, without leaving the vehicle in which the customer is travelling.

With this main object in view, the invention comprises a stand erected outside a building, preferably adjacent the curb of the street, and within sight of an attendant inside a place of business. This is an essential condition when the system is employed by banks, as the teller must be able to identify customers transacting business with the bank. The stand provides means for two-way communication between the customer and the attendant and means for the conveyance of small parcels in either direction. Moreover, the stand may be provided with a normally closed door controlled by the attendant, so that unauthorized persons have no access to the inside of the stand without the consent of the attendant.

The conveyor and/or the means of conversing may also be under control of the attendant, to prevent their use by maliciously or mischievously inclined persons.

It is preferred to locate the stand opposite a restricted parking space above referred to, so that vehicles may approach the same one after another to enable the occupants thereof to transact their business rapidly and without the necessity of leaving their seats. It is to be understood, however, that the stand may be located at other suitable places outside the building and that they are accessible for the use of pedestrians as well as occupants of vehicles.

Other objects of the invention are to be found in details of construction and in novel and beneficial arrangements and combinations of parts, as will be fully brought out in the course of the following description:

In the accompanying drawing, in the several views of which like parts are similarly designated, Figure 1 represents in more or less diagrammatical form, an elevation of a system of devices embodying the invention, Figure 2 is a face view of the stand included in the invention looking in the direction of the arrow A in Figure 1, but drawn to a larger scale, Figure 3 is a section taken on the line 3—3 of Figure 2, Figure 4 is a diagrammatic representation of electrical circuits included in the system, and Figure 5 an enlarged view of the door-locking means shown in Figure 3.

As stated hereinbefore, the system comprises a means for telephonic communication, a means for the transmission of articles in either direction, and a closing means for the stand, controlled from within a building adjacent to which the stand is located.

It is to be understood that none of these means per se are part of the present invention, and that any suitable appliances, old or new, may be employed to perform the functions for which they are provided. For example, the means for telephonic communication may be in the form of the conventional hand instruments or it may be of the so-called loud speaker type; the transmission means may consist of an endless conveyor in the form of a belt or cable, motor-driven or operated by hand, it may be a so-called pneumatic tube or it may be any other device suitable for sending small articles back and forth between the stand and the desk of the attendant inside the building. Moreover, the conveying means may include a receptacle permanently connected therewith, as in the embodiment illustrated in the drawing, or it may be detachably associated with a movable element travelling between the distant points; and the door-controlling means may be electrically or mechanically operated and of any suitable construction. The invention resides solely in the cooperative arrangement and combination of the elements herein recited, without restriction as to the specific character of the same.

Referring to Figure 1 of the drawing, the reference numeral 5 designates a street or roadway, including a driveway 6, a sidewalk 7, and a curb 8. The wall of a building constituting a place of business is shown at 9, and in this wall is a window 10, through which an attendant seated at a desk 12, within the building, may see the part of the street or roadway outside the same.

Opposite the window and preferably adjacent the curb is the stand 13, which may be of any desired size and form and erected and held in place by any suitable means. In the form shown in the drawing the stand has a flat-faced top 14 which may carry the name and business of the concern in the building opposite to which the stand is located.

Obviously, it is desirable to make the stand of artistic design, and its sides may provide space for advertising matter, if so desired.

In the embodiment of the invention, shown in the drawing, the stand has an opening 15 normally closed by a hinged door 16. The door is held in its closed position by a counterweight 17, and it is locked by a catch 18 controlled by an electromagnet 19. The magnet is in a normally open circuit 20 and the catch is normally in its locking position. When it is desired to open the door, the attendant completes the circuit through the medium of a push-button switch 21 at the desk 12, thereby causing the armature of the magnet which forms a part of the catch 18, to be attracted to the coil, thereby releasing the door. The door may subsequently be opened by hand, and after the business has been transacted, the weight will automatically return the door to its closed position, and the catch will automatically lock the door, until its circuit is again completed in a subsequent operation.

Between the stand and the inside of the building is a tunnel 22, extending underneath the sidewalk and adapted to contain the conveying means hereinafter to be described. The electrical conductors used in the system may also pass through this tunnel, or they may be contained in a tube separate thereof, as indicated at 23 in the drawing.

The conveyor, as shown diagrammatically, comprises an endless cable 24 supported by sheaves 25 located at advantageous points in the course of its travel and extending from a point in the upper portion of the stand to a point in convenient adjacency to the desk of the attendant. A container 26 forms a part of the endless conveyor and is accessible to a person at the stand when the door is opened. The container may be closed by a door 27 to prevent spilling of its contents during transmission. A motor indicated at 28 is in a circuit 29 controlled by a push-button switch 30 adjacent the desk, and the cable of the conveyor is engaged by a rotary part of the motor so that when the latter is energized, a longitudinal movement is imparted to the cable to transmit the carrier 26 from the stand to the desk or vice versa. It is preferable to provide a reversible motor, and a circuit and associated switch or switches therewith, whereby the carrier may be moved in either direction at the will of the operator.

The telephonic communication element comprised in the invention has been shown as composed of two loud-speaking instruments 31 and 32 installed, respectively, in the stand 13 and at the desk 12, and connected in a circuit 33, controlled by a push-button switch 34 adjacent the desk.

In the operation of the invention, a customer of the establishment, driving along the driveway 6, stops the vehicle, shown at 35, in the space at the curb 8, opposite the stand 13. The attendant of the establishment, seated at or called to the desk 12, sees the customer through the window 10, and learns the customer's wants by means of the telephonic system of communication.

When he has satisfied himself as to the identity of the customer, the attendant thereupon closes the circuit of the door-closing means, thereby permitting the customer to open the door 16 for access to the conveying means. The customer now places his pass book, deposit slip, check or money, or other article, in the carrier which by means of the motor 28, actuated by the attendant, is transmitted to the desk 12. After the deposit of money or checks has been entered in the pass book or any other transaction has been completed, the attendant conveys the pass book or other article to the customer, who obtains the same from the carrier through the opened door.

The door is automatically closed by the counterweight and is automatically locked by the catch, thereby restoring the system to its original condition ready for the transaction of business by the next following customer driving into the space opposite the stand.

It is to be understood that changes in the construction and arrangement in the elements herein shown and described may be resorted to within the scope of the invention.

For example, an audible or visual signal may be used in connection with or in addition to the telephone to summon an attendant of the establishment, should he be absent from the desk or should the use of a desk be dispensed with, as may be the case in establishments employing a limited number of clerks.

Also, the conveyor or its motor may be automatically energized as, for instance, by closing the door of the stand, instead of manually as hereinbefore described.

It has been thought unnecessary to illustrate these modifications in the drawing.

What I claim and desire to secure by Letters Patent is:

1. A system of the character described wherein personal identification of the customer is requisite, comprising in combination with a building, a conduit providing a means for two-way communication between opposed stations inside the building and outside of the same, the station outside the building being characterized by a fixed stand having an opening accessible to a pedestrian or the occupant of a vehicle, means for permitting visual identification of the party at the stand from within the building, and elements in the conduit for the transmission of objects and sound from one station to another.

2. A system of the character described wherein personal identification of the customer is requisite, comprising in combination with a building, a conduit providing a means for two-way communication between opposed stations inside the building and outside of the same, the station outside the building being characterized by a fixed stand having a door-closed opening accessible to a pedestrian or the occupant of a vehicle, means for permitting visual identification of the party at the stand from within the building, an element in the conduit for the transmission of objects from either station to the other, and means for controlling movement of the door of the stand from the station within the building.

3. A system of the character described wherein personal identification of the customer is requisite, comprising in combination with a building, a conduit providing a means for two-way communication between opposed stations inside the building and outside of the same, the stations being so located that persons at the stations can see one another, thereby permitting visual identification of the person at the stand by the person within the building, the station outside the building being characterized by a fixed stand having an opening accessible to a pedestrian or the occupant of a vehicle, and elements in the conduit for the transmission of objects and sound from either station to the other.

4. A system of the character described wherein personal identification of the customer is requisite, comprising in combination with a building, a conduit providing a means for two-way communication between opposed stations inside the building and outside of the same, the stations being so located that persons at the stations can see one another, thereby permitting visual identification of the person at the stand by the person within the building, the station outside the building being characterized by a fixed stand having a door-closed opening accessible to a pedestrain or the occupant of a vehicle, an element in the conduit for the transmission of objects from one station to another, means for permitting visual identification of the party at the stand from within the building and means for controlling movement of the door of the stand from the station within the building.

5. A system of the character described wherein personal identification of the customer is requisite, comprising in combination with a banking establishment a conduit providing a means for two-way communication between opposed stations inside the establishment and outside of the same, the station outside the establishment being characterized by a fixed stand having a door-closed opening accessible to a pedestrian or the occupant of a vehicle, means for permitting visual identification of the party at the stand from within the establishment, and an element in the conduit for the transmission of objects from either station to the other.

WALTER E. LINDSAY.